(12) United States Patent
Goeltz et al.

(10) Patent No.: US 11,005,113 B2
(45) Date of Patent: May 11, 2021

(54) SOLIDS MITIGATION WITHIN FLOW BATTERIES

(71) Applicant: Lockheed Martin Energy, LLC, Bethesda, MD (US)

(72) Inventors: John Goeltz, Carmel, CA (US); Thomas H. Madden, Glastonbury, CT (US)

(73) Assignee: LOCKHEED MARTIN ENERGY, LLC, Bethesda, MD (US)

( * ) Notice: Subject to any disclaimer, the term of this patent is extended or adjusted under 35 U.S.C. 154(b) by 373 days.

(21) Appl. No.: 15/240,990

(22) Filed: Aug. 18, 2016

(65) Prior Publication Data
US 2017/0054164 A1 Feb. 23, 2017

Related U.S. Application Data

(60) Provisional application No. 62/206,920, filed on Aug. 19, 2015.

(51) Int. Cl.
*H01M 8/04276* (2016.01)
*H01M 8/18* (2006.01)
(Continued)

(52) U.S. Cl.
CPC ... *H01M 8/04276* (2013.01); *H01M 8/04186* (2013.01); *H01M 8/04201* (2013.01); *H01M 8/188* (2013.01); *Y02E 60/50* (2013.01)

(58) Field of Classification Search
CPC .............. H01M 8/04276; H01M 8/188; H01M 8/04186; H01M 8/04201; Y02E 60/50
See application file for complete search history.

(56) References Cited

U.S. PATENT DOCUMENTS 3,779,813 A 12/1973 Rabut
4,075,401 A 2/1978 Miyagawa
(Continued)

FOREIGN PATENT DOCUMENTS

CN 103187551 A 7/2013
DE 10-2011-120802 A1 6/2013
(Continued)

OTHER PUBLICATIONS

R.K. Sen, et al., "Metal-Air Battery Assessment," U.S. Department of Energy Report for Contract DE-AC06-76RLO1830, May 1988, 84 pages.
(Continued)

*Primary Examiner* — Eugenia Wang
(74) *Attorney, Agent, or Firm* — BakerHostetler

(57) ABSTRACT

Solids can sometimes form in one or more electrolyte solutions during operation of flow batteries and related electrochemical systems. Over time, the solids can accumulate and compromise the integrity of flow pathways and other various flow battery components. Flow batteries configured for mitigating solids therein can include an autonomous solids separator, such as a lamella clarifier. Such flow batteries can include a first half-cell containing a first electrolyte solution, a second half-cell containing a second electrolyte solution, a first flow loop configured to circulate the first electrolyte solution through the first half-cell, a second flow loop configured to circulate the second electrolyte solution through the second half-cell, and at least one lamella clarifier in fluid communication with at least one of the first half-cell and the second half-cell. A hydrocyclone can be used as an alternative to a lamella clarifier in some instances.

14 Claims, 9 Drawing Sheets

(51) Int. Cl.
*H01M 8/04186* (2016.01)
*H01M 8/04082* (2016.01)

(56) References Cited

U.S. PATENT DOCUMENTS

| | | | |
|---|---|---|---|
| 4,532,193 | A | 7/1985 | Kniazzeh et al. |
| 4,735,872 | A | 4/1988 | Maimoni |
| 4,902,589 | A | 2/1990 | Dahn et al. |
| 4,948,681 | A | 8/1990 | Zagrodnik et al. |
| 5,188,911 | A | 2/1993 | Downing et al. |
| 5,618,641 | A | 4/1997 | Arias |
| 5,637,416 | A | 6/1997 | Yoshii et al. |
| 5,665,212 | A | 9/1997 | Zhong et al. |
| 6,296,746 | B1 | 10/2001 | Broman et al. |
| 7,229,564 | B2 | 6/2007 | Liu et al. |
| 8,268,475 | B2 | 9/2012 | Tucholski |
| 8,268,511 | B2 | 9/2012 | Mekala et al. |
| 9,443,782 | B1 | 9/2016 | Steimle et al. |
| 2003/0087141 | A1 | 5/2003 | Sun et al. |
| 2003/0087156 | A1 | 5/2003 | Broman et al. |
| 2003/0099884 | A1 | 5/2003 | Chiang et al. |
| 2004/0131916 | A1 | 7/2004 | Hodge et al. |
| 2004/0191623 | A1 | 9/2004 | Kubata et al. |
| 2004/0224190 | A1 | 11/2004 | Sasahara et al. |
| 2004/0233616 | A1 | 11/2004 | Arai et al. |
| 2005/0098435 | A1 | 5/2005 | Jacobson et al. |
| 2005/0158615 | A1 | 7/2005 | Samuel et al. |
| 2005/0260473 | A1 | 11/2005 | Wang |
| 2006/0068265 | A1 | 3/2006 | Hanlon et al. |
| 2007/0037037 | A1 | 2/2007 | Nguyen et al. |
| 2007/0054175 | A1 | 3/2007 | Maendle et al. |
| 2007/0125493 | A1 | 6/2007 | Jang et al. |
| 2007/0227654 | A1 | 10/2007 | Liu et al. |
| 2007/0287047 | A1 | 12/2007 | Kaiser et al. |
| 2008/0038622 | A1 | 2/2008 | Valensa et al. |
| 2008/0142152 | A1 | 6/2008 | Debe et al. |
| 2008/0152839 | A1 | 6/2008 | Han et al. |
| 2008/0291027 | A1 | 11/2008 | Lake |
| 2008/0305385 | A1 | 12/2008 | Smiljanich et al. |
| 2008/0318110 | A1 | 12/2008 | Budinski et al. |
| 2010/0003545 | A1 | 1/2010 | Horne et al. |
| 2010/0047650 | A1 | 2/2010 | Iino et al. |
| 2010/0291442 | A1 | 11/2010 | Wang et al. |
| 2011/0223450 | A1 | 9/2011 | Horne et al. |
| 2011/0244277 | A1 | 10/2011 | Gordon, II et al. |
| 2012/0040254 | A1 | 2/2012 | Amendola et al. |
| 2012/0211426 | A1* | 8/2012 | Santoro ............... B01F 5/0473 210/665 |
| 2012/0258345 | A1 | 10/2012 | Zaffou et al. |
| 2013/0037760 | A1 | 2/2013 | Maeda et al. |
| 2013/0071714 | A1 | 3/2013 | Perry et al. |
| 2013/0095361 | A1 | 4/2013 | Sinsabaugh et al. |
| 2013/0157097 | A1 | 6/2013 | Kampanatsanyakorn et al. |
| 2013/0266829 | A1 | 10/2013 | Cole et al. |
| 2014/0051007 | A1 | 2/2014 | Blanchet et al. |
| 2014/0227620 | A1* | 8/2014 | Perry ............... H01M 8/0687 429/416 |
| 2014/0234734 | A1 | 8/2014 | Tsutsumi et al. |
| 2014/0308594 | A1 | 10/2014 | Dudney et al. |
| 2014/0349147 | A1 | 11/2014 | Shaffer, II et al. |
| 2014/0370404 | A1 | 12/2014 | Kato et al. |
| 2015/0079493 | A1 | 3/2015 | Guthrie |
| 2015/0099199 | A1 | 4/2015 | Bazant et al. |
| 2015/0136301 | A1 | 5/2015 | Cyman, Jr. et al. |
| 2016/0020477 | A1 | 1/2016 | Smettz et al. |
| 2016/0036060 | A1 | 2/2016 | Brezovec |
| 2016/0240868 | A1 | 8/2016 | Warrington et al. |
| 2016/0244349 | A1* | 8/2016 | St. John ............... C02F 9/00 |
| 2016/0264442 | A1* | 9/2016 | Knoop ............... C02F 9/00 |
| 2016/0308224 | A1 | 10/2016 | Morris-Cohen et al. |

FOREIGN PATENT DOCUMENTS

| | | |
|---|---|---|
| JP | H-06-290795 | 10/1994 |
| JP | 2001-283879 A | 10/2001 |
| JP | 2005-228633 A | 8/2005 |
| JP | 2008-047313 A | 2/2008 |
| JP | 2008-078104 A | 4/2008 |
| JP | 2008-091110 A | 4/2008 |
| JP | 2008-166260 A | 7/2008 |
| JP | 2011-228059 A | 11/2011 |
| JP | 2012-252955 A | 12/2012 |
| JP | 2014-520382 A | 8/2014 |
| WO | WO-00/16418 A1 | 3/2000 |
| WO | WO-2010/033118 A1 | 3/2010 |
| WO | WO-2012/177255 A1 | 12/2012 |

OTHER PUBLICATIONS

R.P. Hollandsworth, et al., "Zinc/Ferricyanide Battery Development Phase IV," U.S. Department of Energy Report for Contract DE-AC04-76DP00789, May 1985, 278 pages.

Soloveichik, "Flow Batteries: Current Status and Trends," 2015, Chem. Rev., 115 (20), pp. 11533-11558.

International Search Report and Written Opinion dated Jan. 26, 2017, which issued in International Application No. PCT/US16/57963.

International Search Report and Written Opinion dated Jan. 19, 2017, which issued in International Application No. PCT/US16/56672.

Japanese Office Action from 2016-544047, dated Jul. 3, 2018, 11 pages.

Ma et al., "High-performance supercapacitor electrodes based on porous flexible carbon nanofiber paper treated by surface chemical etching," Chemical Engineering Journal, Aug. 2014.

McCreery, "Advanced Carbon Electrode Materials for Molecular Electrochemistry," Chem Rev, 2008, pp. 2646-2687, vol. 108.

Extended European Search Report from European Patent Application No. 14845729.4, dated May 8, 2017.

International Search Report and Written Opinion from PCT/US2017/030452, dated Jul. 3, 2017.

* cited by examiner

SOLIDS MITIGATION WITHIN FLOW BATTERIES

CROSS-REFERENCE TO RELATED APPLICATIONS

The present application claims the benefit of priority under 35 U.S.C. § 119 from U.S. Provisional Patent Application 62/206,920, filed on Aug. 19, 2015 and incorporated herein by reference in its entirety.

STATEMENT REGARDING FEDERALLY SPONSORED RESEARCH OR DEVELOPMENT

Not applicable.

FIELD

The present disclosure generally relates to energy storage and, more specifically, to flow batteries and related electrochemical systems that are configured for addressing the presence of solids therein.

BACKGROUND

Electrochemical energy storage systems, such as batteries, supercapacitors and the like, have been widely proposed for large-scale energy storage applications. Various battery designs, including flow batteries, have been considered for this purpose. Compared to other types of electrochemical energy storage systems, flow batteries can be advantageous, particularly for large-scale applications, due to their ability to decouple the parameters of power density and energy density from one another.

Flow batteries generally include negative and positive active materials in corresponding electrolyte solutions, which are flowed separately across opposing faces of a membrane or separator in an electrochemical cell containing negative and positive electrodes. The flow battery is charged or discharged through electrochemical reactions of the active materials that occur inside the two half-cells. As used herein, the terms "active material," "electroactive material," "redox-active material" or variants thereof synonymously refer to materials that undergo a change in oxidation state during operation of a flow battery or other electrochemical energy storage systems (i.e., during charging or discharging). Transition metals and their coordination complexes can be particularly desirable active materials due to their multiple oxidation states.

Although flow batteries hold significant promise for large-scale energy storage applications, they have often been plagued by sub-optimal energy storage performance (e.g., round trip energy efficiency), limited cycle life, and various operational issues. Despite significant investigational efforts, no commercially viable flow battery technologies have yet been developed.

Solids formation within flow batteries represents one operational issue that can be especially problematic, since solids can deposit upon or within various flow battery components and compromise one's ability to circulate an electrolyte solution. Pores within the separator of a flow battery can also become occluded by circulating solids, which can similarly compromise operability.

Factors leading to solids formation in a flow battery can include, for example, impurities in the active materials, high active material concentrations that approach or exceed saturation concentrations, chemical or electrochemical side reactions, insoluble buffers, and the like. In many instances, solids formation can be an unavoidable consequence of the battery chemistry. Unless one can effectively mitigate the formation of solids in a flow battery, an otherwise desirable system of active materials can become untenable for use.

Conventional approaches used for addressing the presence of solids in flow batteries can include, for example, in-line filters, crystallizers, or settling tanks. These approaches can undesirably lead to excessive pressure drops, high parasitic loads, and slow or incomplete separation, however. These factors are generally undesirable and can compromise the ultimate operability of a flow battery, particularly for large-scale operations. Moreover, some conventional approaches for mitigating solids in flow batteries can require frequent downtime for system maintenance, such as for cleaning or to replace filters, for example.

In view of the foregoing, flow batteries readily configured to mitigate the presence of solids and methods associated therewith would be highly desirable in the art. The present disclosure satisfies the foregoing needs and provides related advantages as well.

SUMMARY

In some embodiments, the present disclosure provides flow batteries including a first half-cell containing a first electrolyte solution, a second half-cell containing a second electrolyte solution, a first flow loop configured to circulate the first electrolyte solution through the first half-cell, a second flow loop configured to circulate the second electrolyte solution through the second half-cell, and at least one lamella clarifier in fluid communication with at least one of the first half-cell and the second half-cell. A hydrocyclone can be used as an alternative to a lamella clarifier in some embodiments.

In some embodiments, the present disclosure describes methods for mitigating solids in a flow battery. The methods can include placing at least one lamella clarifier in fluid communication with at least one half-cell of a flow battery containing an electrolyte solution, circulating the electrolyte solution through the at least one lamella clarifier and the at least one half-cell, discharging a solids-containing outflow from the at least one lamella clarifier, and directing the solids-containing outflow away from the at least one half-cell. A hydrocyclone can be used as an alternative to a lamella clarifier in some embodiments.

The foregoing has outlined rather broadly the features of the present disclosure in order that the detailed description that follows can be better understood. Additional features and advantages of the disclosure will be described hereinafter. These and other advantages and features will become more apparent from the following description.

BRIEF DESCRIPTION OF THE DRAWINGS

For a more complete understanding of the present disclosure, and the advantages thereof, reference is now made to the following descriptions to be taken in conjunction with the accompanying drawings describing specific embodiments of the disclosure, wherein.

DETAILED DESCRIPTION

Figure 1:
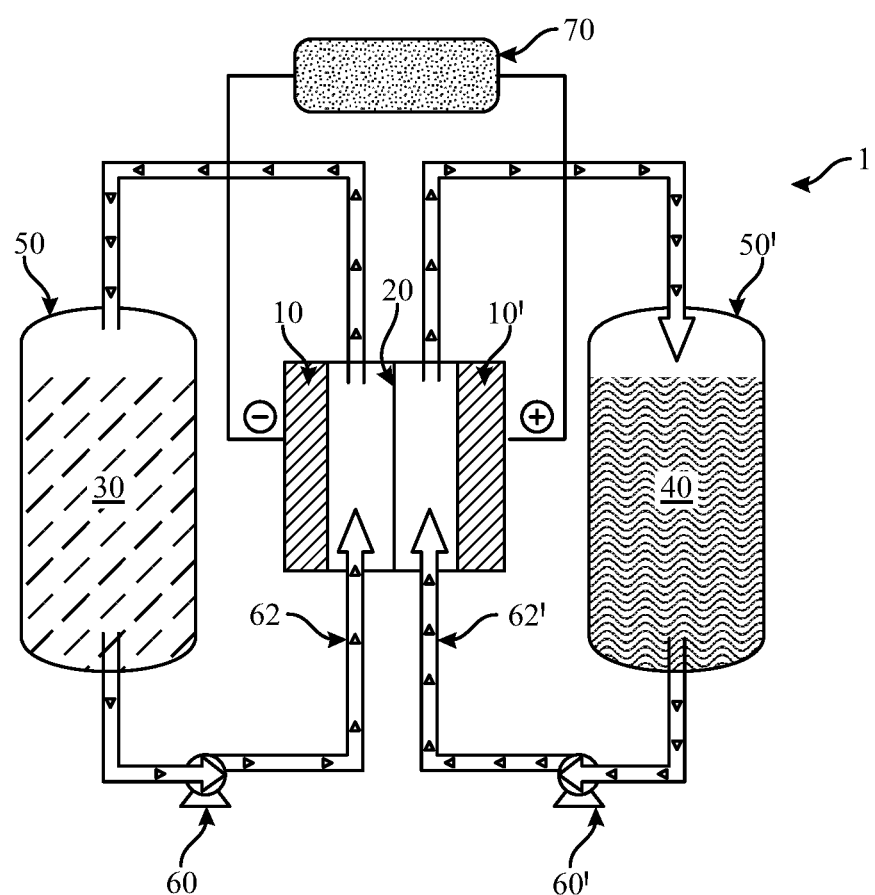
FIG. 1 shows a schematic of an illustrative flow battery containing a single electrochemical cell.

The present disclosure is directed, in part, to flow batteries containing an autonomous solids separator, such as a lamella clarifier or hydrocyclone. The present disclosure is also directed, in part, to methods for removing solids from a flow battery using an autonomous solids separator, such as a lamella clarifier or hydrocyclone.

The present disclosure may be understood more readily by reference to the following description taken in connection with the accompanying figures and examples, all of which form a part of this disclosure. It is to be understood that this disclosure is not limited to the specific products, methods, conditions or parameters described and/or shown herein. Further, the terminology used herein is for purposes of describing particular embodiments by way of example only and is not intended to be limiting unless otherwise specified. Similarly, unless specifically stated otherwise, any description herein directed to a composition is intended to refer to both solid and liquid versions of the composition, including solutions and electrolytes containing the composition, and electrochemical cells, flow batteries, and other energy storage systems containing such solutions and electrolytes. Further, it is to be recognized that where the disclosure herein describes an electrochemical cell, flow battery, or other energy storage system, it is to be appreciated that methods for operating the electrochemical cell, flow battery, or other energy storage system are also implicitly described.

It is also to be appreciated that certain features of the present disclosure may be described herein in the context of separate embodiments for clarity purposes, but may also be provided in combination with one another in a single embodiment. That is, unless obviously incompatible or specifically excluded, each individual embodiment is deemed to be combinable with any other embodiment(s) and the combination is considered to represent another distinct embodiment. Conversely, various features of the present disclosure that are described in the context of a single embodiment for brevity's sake may also be provided separately or in any sub-combination. Finally, while a particular embodiment may be described as part of a series of steps or part of a more general structure, each step or sub-structure may also be considered an independent embodiment in itself.

Unless stated otherwise, it is to be understood that each individual element in a list and every combination of individual elements in that list is to be interpreted as a distinct embodiment. For example, a list of embodiments presented as "A, B, or C" is to be interpreted as including the embodiments "A," "B," "C," "A or B," "A or C," "B or C," or "A, B, or C."

In the present disclosure, the singular forms of the articles "a," "an," and "the" also include the corresponding plural references, and reference to a particular numerical value includes at least that particular value, unless the context clearly indicates otherwise. Thus, for example, reference to "a material" is a reference to at least one of such materials and equivalents thereof.

In general, use of the term "about" indicates approximations that can vary depending on the desired properties sought to be obtained by the disclosed subject matter and is to be interpreted in a context-dependent manner based on functionality. Accordingly, one having ordinary skill in the art will be able to interpret a degree of variance on a case-by-case basis. In some instances, the number of significant figures used when expressing a particular value may be a representative technique of determining the variance permitted by the term "about." In other cases, the gradations in a series of values may be used to determine the range of variance permitted by the term "about." Further, all ranges in the present disclosure are inclusive and combinable, and references to values stated in ranges include every value within that range.

As discussed above, energy storage systems that are operable on a large scale while maintaining high efficiency values can be extremely desirable. Flow batteries have generated significant interest in this regard, but there remains considerable room for improving their operating performance. Solids formation prior to or during operation of a flow battery is one issue that can compromise operability. Specifically, solids accumulation can compromise the circulation of an electrolyte solution through the flow battery and/or damage various components therein. Although some factors leading to solids formation can be avoided, others can be an inherent consequence of the battery chemistry. Several approaches are conventionally known for mitigating the occurrence of solids in flow batteries, but they can lead to various operational disadvantages, including a possible need for at least some degree of ongoing active intervention by an operator. For example, in-line filters can need periodic cleaning or replacement so that continued separation can take place.

The present inventors discovered various alternative approaches suitable for mitigating circulating solids within flow batteries. Specifically, the approaches identified by the inventors allow autonomous or near-autonomous separation of solids to take place at high throughput volumes of electrolyte solution. Autonomous solids separators that are compatible for use within flow batteries include, for example, lamella clarifiers and hydrocyclones. These solids separators avert the pressure drops and related operational issues associated with more commonly used separation technologies. Moreover, because such solids separators operate autonomously or near-autonomously, flow batteries incorporating these solids separators can operate with a much lower degree of operator intervention than would otherwise be possible. As a further advantage, flow batteries incorporating the autonomous solids separators disclosed herein can utilize active materials and other chemistries that are otherwise too risky for use due to a propensity toward solids formation. For example, by incorporating an autonomous solids separator in a flow battery, electrolyte solutions can safely utilize active materials nearer to the saturation concentration than would otherwise be possible. Thus, the present disclosure can allow active materials with favorable electrochemical properties to be utilized in flow batteries having high operational efficiency. Before further discussing the various approaches discovered by the present inventors, illustrative flow battery configurations and their operating characteristics will first be described in brief in order that the advancements of the present disclosure can be better understood.

Unlike typical battery technologies (e.g., Li-ion, Ni-metal hydride, lead-acid, and the like), where active materials and other components are housed in a single assembly, flow batteries transport (e.g., via pumping) redox-active energy storage materials from storage tanks (i.e., electrolyte reservoirs) through an electrochemical stack containing one or more electrochemical cells. This design feature decouples the electrical energy storage system power from the energy storage capacity, thereby allowing for considerable design flexibility and cost optimization to be realized. FIG. 1 shows a schematic of an illustrative flow battery containing a single electrochemical cell. Although FIG. 1 shows a flow battery containing a single electrochemical cell, approaches for combining multiple electrochemical cells together are known and are discussed in brief hereinbelow. Approaches for incorporating an autonomous solids separator within such a flow battery will also be discussed in greater detail hereinbelow.

As shown in FIG. 1, flow battery 1 includes an electrochemical cell that features separator 20 between the two electrodes 10 and 10' of the electrochemical cell. As used herein, the terms "separator" and "membrane" refer synonymously to an ionically conductive and electrically insulating material disposed between the positive and negative electrodes of an electrochemical cell. Electrodes 10 and 10' are formed from a suitably conductive material, such as a metal, carbon, graphite, and the like, and the materials for the two can be the same or different. Although FIG. 1 has shown electrodes 10 and 10' as being spaced apart from separator 20, electrodes 10 and 10' can also be disposed in direct or indirect contact with separator 20 in some embodiments. The material(s) forming electrodes 10 and 10' can be porous, such that they have a high surface area for contacting the electrolyte solutions containing first active material 30 and second active material 40. Which are capable of being cycled between an oxidized state and a reduced state. Circulating solids can occlude the porosity in electrodes 10 and 10' or in separator 20 unless addressed in some manner, such as utilizing the autonomous solids separators described herein.

Pump 60 affects transport of a first active material in first electrolyte solution 30 from electrolyte reservoir 50 to the electrochemical cell via flow loop 62. The flow battery also suitably includes second electrolyte reservoir 50' that contains a second active material in second electrolyte solution 40, which is transported to the other half-cell by flow loop 62'. Second electrolyte solution 40 can be the same as first electrolyte solution 30 (but have its active material in a different oxidation state), or it can be compositionally different. Second pump 60' can affect transport of second electrolyte solution 40 to the electrochemical cell. Pumps (not shown in FIG. 1) can also be used to affect transport of first and second electrolyte solutions 30 and 40 from the electrochemical cell back to first and second electrolyte reservoirs 50 and 50'. Other methods of affecting fluid transport, such as siphons, for example, can also suitably transport first and second electrolyte solutions 30 and 40 into and out of the electrochemical cell. Also shown in FIG. 1 is power source or load 70, which completes the circuit of the electrochemical cell and allows a user to collect or store electricity during its operation.

It should be understood that FIG. 1 depicts a specific, non-limiting configuration of a particular flow battery. Accordingly, flow batteries consistent with the spirit of the present disclosure can differ in various aspects relative to the configuration of FIG. 1.

As indicated above, multiple electrochemical cells can also be combined with one another in an electrochemical stack in order to increase the rate that energy can be stored and released during operation. The amount of energy released is determined by the overall amount of active material that is present. An electrochemical stack utilizes bipolar plates between adjacent electrochemical cells to establish electrical communication but not direct fluid communication between the two cells. Suitable materials for bipolar plates can include carbon, graphite, metal, or a combination thereof. Bipolar plates can also be fabricated from non-conducting polymers having a conductive material dispersed therein, such as carbon particles or fibers, metal particles or fibers, and/or carbon nanotubes.

Bipolar plates can also have innate or designed flow fields that provide a greater surface area for contacting an electrolyte solution than would otherwise be possible through simple interfacial contact. In some cases, designed flow fields can be incorporated in a bipolar plate to control the flow dynamics in a desired manner. Flow field architectures incorporating an open flow field, in which the flow dynamics of an electrolyte solution are largely non-regulated, are also possible. Designed flow fields that provide for directional change in at least one coordinate axis can often offer more efficient cell operation than can open flow fields. Interdigitated flow fields, for example, can provide high current density values while maintaining the cell voltage at a desirably low level.

In some instances, an electrolyte solution can be delivered to and withdrawn from each electrochemical cell via a fluid inlet manifold and a fluid outlet manifold (not shown in FIG. 1). In some embodiments, the fluid inlet manifold and the fluid outlet manifold can provide and withdraw an electrolyte solution via the bipolar plates separating adjacent electrochemical cells. Separate manifolds can provide each electrolyte solution to the two half-cells of each electrochemical cell. In more particular embodiments, the fluid inlet manifold and the fluid outlet manifold can be configured to supply and withdraw the electrolyte solutions via opposing lateral faces of the bipolar plates.

As discussed in brief above, flow batteries of the present disclosure can incorporate an autonomous solids separator to mitigate ongoing or periodic formation of solids within the flow battery. Autonomous solids separators suitable for use in conjunction with the present disclosure can include, for example, lamella clarifiers and hydrocyclones. Choice of a particular autonomous solids separator for utilization in a given flow battery can be dictated by a number of factors including, for example, the battery chemistry, the particle size, the amount of solids formed, the circulation rate of the electrolyte solution, and the like. One having ordinary skill in the art will be able to choose a solids separator suitable for use in a given application by having the benefit of the present disclosure. In addition, one having ordinary skill in the art will understand how to modify the operating conditions of a given flow battery, if needed, to accommodate the use of a particular autonomous solids separator therein.

Accordingly, in various embodiments, flow batteries of the present disclosure can include a first half-cell containing a first electrolyte solution, a second half-cell containing a second electrolyte solution, a first flow loop configured to circulate the first electrolyte solution through the first half-cell, a second flow loop configured to circulate the second electrolyte solution through the second half-cell, and at least one autonomous solids separator in fluid communication with at least one of the first half-cell and the second half-cell. The at least one autonomous solids separator can be in fluid communication with a negative half-cell of the flow battery, a positive half-cell of the flow battery, or both the negative and positive half-cells of the flow battery.

In some embodiments, the at least one autonomous solids separator can be at least one lamella clarifier. In other embodiments, the at least one autonomous solids separator can be at least one hydrocyclone. In some embodiments, both one or more lamella clarifiers and one or more hydrocyclones can be present in any combination in a given flow battery. In other embodiments, a given flow battery can contain multiple lamella clarifiers or multiple hydrocyclones. The choice of a particular configuration for the at least one autonomous solids separator in the flow battery can be determined by one having ordinary skill in the art and the benefit of this disclosure. Absent design or operational considerations to be taken into account for a given application, the present inventors consider that lamella clarifiers and hydrocyclones can essentially serve as drop-in replacements for one another in most embodiments of the present disclosure. Thus, any particular embodiments described herein utilizing a lamella clarifier can be practiced in a substantially equivalent manner with a hydrocyclone unless obvious incompatibilities exist.

Accordingly, in more specific embodiments, flow batteries of the present disclosure can include a first half-cell containing a first electrolyte solution, a second half-cell containing a second electrolyte solution, a first flow loop configured to circulate the first electrolyte solution through the first half-cell, a second flow loop configured to circulate the second electrolyte solution through the second half-cell, and at least one lamella clarifier in fluid communication with at least one of the first half-cell and the second half-cell. In other more specific embodiments, flow batteries of the present disclosure can include a first half-cell containing a first electrolyte solution, a second half-cell containing a second electrolyte solution, a first flow loop configured to circulate the first electrolyte solution through the first half-cell, a second flow loop configured to circulate the second electrolyte solution through the second half-cell, and at least one hydrocyclone in fluid communication with at least one of the first half-cell and the second half-cell.

Before discussing the various embodiments of the present disclosure in more detail, particularly exemplary locations in which one or more autonomous solids separators can be deployed within a flow battery, a brief discussion of lamella clarifiers and hydrocyclones will first be provided so that the present disclosure can be better understood.

In general, lamella clarifiers include a plurality of parallel plates that are inclined relative to the earth's surface. Such parallel plate configurations provide a high surface area for settling of solids to take place, thereby allowing a fluid phase with a decreased solids content to exit from an outflow location of the lamella clarifier. As the fluid phase passes over the plates, solids accumulate thereupon and fall to the low point of the plates under the influence of gravity, such that they do not disrupt normal fluid flow pathways. The solids can then further settle into an accumulation area, such as a hopper or funnel, from which they can be removed or subsequently processed, as discussed hereinafter.

Figure 2:
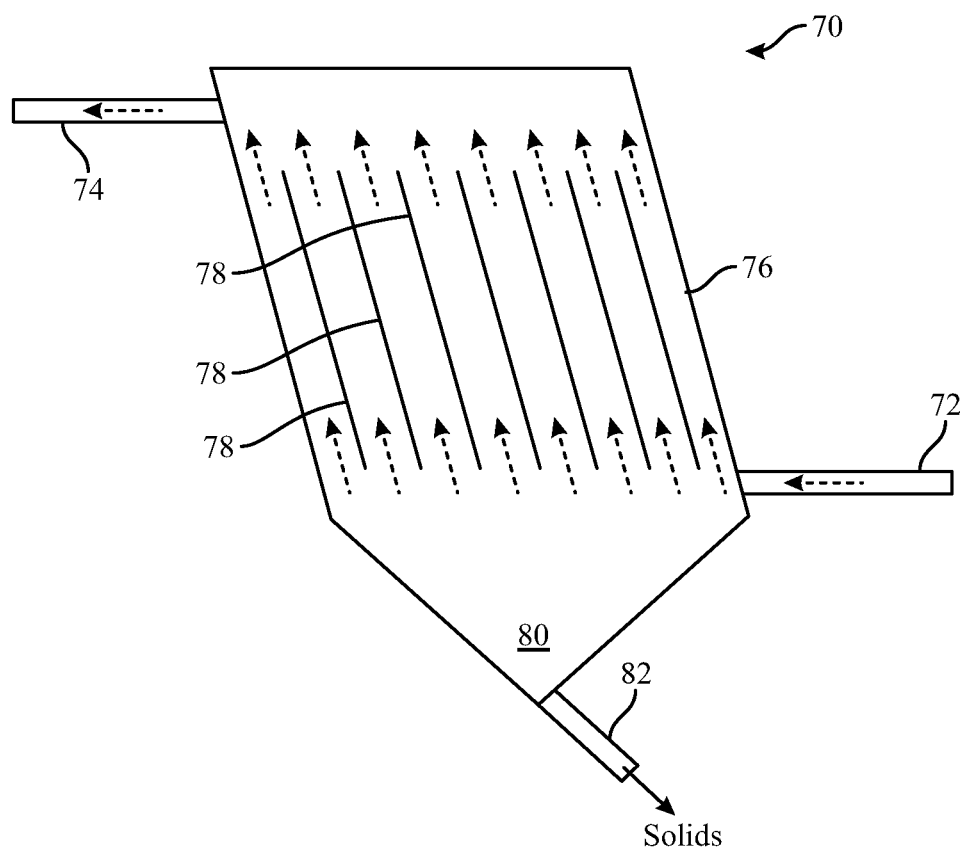
FIG. 2 shows a schematic of an illustrative lamella clarifier.

FIG. 2 shows a schematic of an illustrative lamella clarifier. As shown in FIG. 2, lamella clarifier 120 includes inflow location 72 and outflow location 74 that are fluidly connected to an interior of tank 76. Inflow location 72 and outflow location 74 can constitute a portion of a flow loop in which lamella clarifier 120 is disposed (see FIGS. 4 and 5 below, for example). Within tank 76 are a plurality of parallel plates 78 that are inclined relative to the earth's surface and are generally parallel to the direction of fluid flow in tank 76 (indicated by broken arrows in FIG. 2). During operation, solids collect on parallel plates 78 and fall downward thereon under the influence of gravity. Upon falling off parallel plates 78, the solids can accumulate in hopper 80 for subsequent processing upon removal through solids outlet 82. It is to be recognized that FIG. 2 simply provides an illustrative lamella clarifier configuration so that the embodiments of the present disclosure can be better understood. In practice, the number of plates, the plate inclination, and construction materials for the lamella clarifier can be varied, for example, to accommodate the needs of a particular application.

In more particular embodiments, the lamella clarifier can include between about 3 and about 100 parallel plates, or between about 4 and about 50 parallel plates, or between about 5 and about 20 parallel plates. While the parallel plates can be substantially vertical with respect to the earth's surface, they are more typically oriented at an acute angle. In more particular embodiments, the parallel plates can have an angle of inclination ranging between about 30 to about 80 degrees with respect to the earth's surface, or an angle ranging between about 40 to about 60 degrees with respect to the earth's surface. Separation between adjacent parallel plates can be chosen such that a pressure drop does not occur during operation, such as due to occlusion of the flow pathway between adjacent parallel plates upon solids accumulation. Illustrative materials suitable for constructing various components of a lamella clarifier can include, for example, steel or low-cost plastics such as polyvinyl chloride, chlorinated polyvinyl chloride, polyethylene, or polypropylene.

Hydrocyclones differ from lamella clarifiers in that hydrocyclones employ a centrifugal force to induce separation of solids, rather than through gravity-assisted deposition upon parallel plates. Since solids are generally more dense than the fluid phase in which they are disposed, the centrifugally separated solids progress to the bottom of the hydrocyclone for further processing, and a solids-depleted fluid phase is removed from the top of the hydrocyclone, as discussed further herein.

Figure 3:
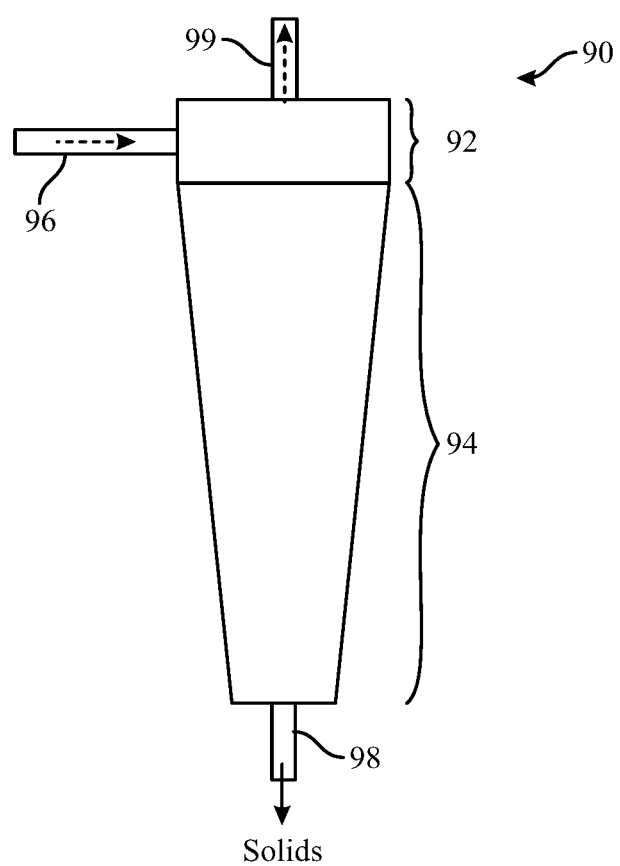
FIG. 3 shows a schematic of an illustrative hydrocyclone.

FIG. 3 shows a schematic of an illustrative hydrocyclone. As shown in FIG. 3, hydrocyclone 90 has a body containing cylindrical section 92 and conical section 94. Inflow location 96 is fluidly connected to the body, thereby allowing a solids-containing fluid phase to be introduced thereto. Generally, inflow location 96 is located upon cylindrical section 92, but it can be located upon conical section 94 in some embodiments. Once the solids-containing fluid phase enters conical section 94, it undergoes autonomous rotational motion to induce a centrifugal force thereon. The centrifugal force results in separation of the solids from the fluid phase. Since the solids are generally denser than the fluid phase, the solids fall to the bottom of hydrocyclone 90 and exit through solids outlet 98. The residual, solids-depleted fluid phase, in contrast, proceeds to the top of hydrocyclone 90 and exits through outflow location 99. Similar to a lamella clarifier, inflow location 96 and outflow location 99 can constitute a portion of a flow loop in which hydrocyclone 90 is disposed (see FIGS. 4 and 5 below, for example). It is likewise to be understood that FIG. 3 simply provides an illustrative hydrocyclone configuration so that the embodiments of the present disclosure can be better understood.

As indicated above, a lamella clarifier or a hydrocyclone can define a portion of flow loop in a flow battery. More specifically, a lamella clarifier or a hydrocyclone can define a portion of at least one of the first flow loop or the second flow loop in the flow batteries of the present disclosure. Illustrative locations in a flow battery in which an autonomous solids separator, such as a lamella clarifier or a hydrocyclone, can be placed will now be discussed in further detail.

In some embodiments, a lamella clarifier or hydrocyclone can be disposed in a flow loop between a pump and an entry location of the flow loop into the corresponding half-cell. More specifically, in at least some embodiments, the at least one lamella clarifier or the at least one hydrocyclone can be disposed between the pump and an entry location of the first flow loop to the first half-cell or an entry location of the second flow loop to the second half-cell. Such a configuration is shown in FIG. 4.

Figure 4:
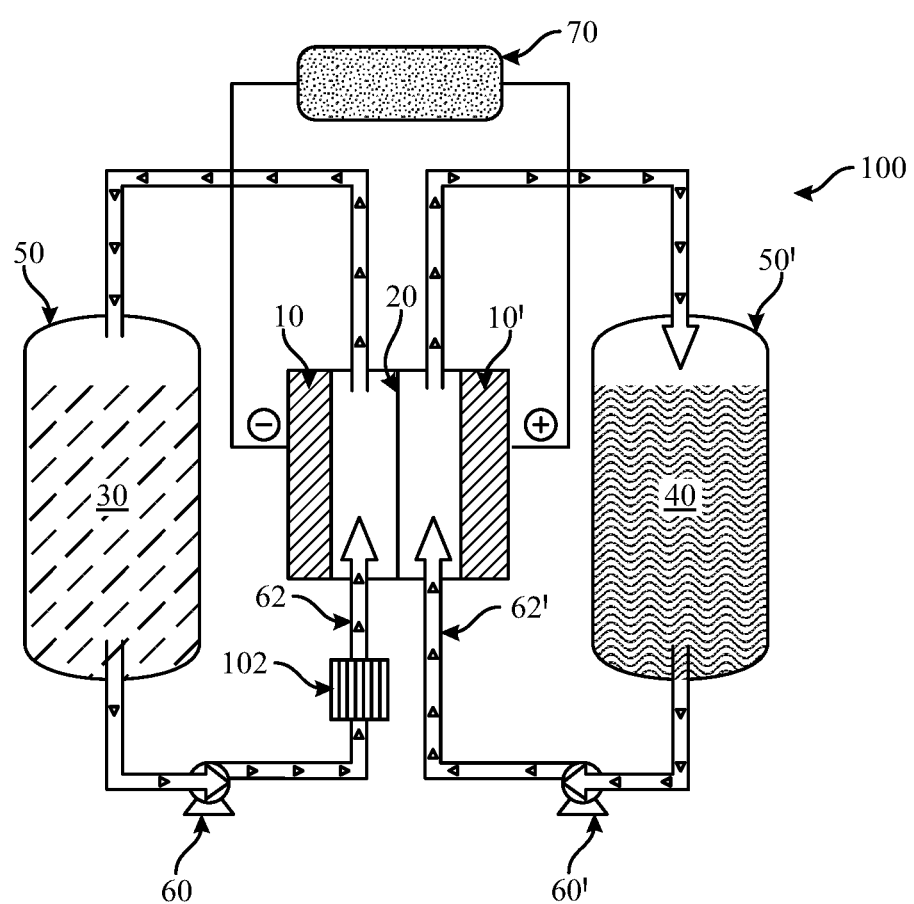
FIG. 4 shows a schematic of an illustrative flow battery containing an autonomous solids separator located in a flow loop between a pump and a half-cell of the flow battery.

FIG. 4 shows a schematic of an illustrative flow battery containing an autonomous solids separator located in a flow loop between a pump and a half-cell of the flow battery. Disposing a lamella clarifier or hydrocyclone in this location can provide immediate downstream protection against solids incursion within the sensitive components of a flow battery half-cell (e.g., interstitial space within the electrode and/or the pores of the separator located between the two half-cells). FIG. 4 shares numerous features in common with FIG. 1 and, accordingly, may be better understood by reference thereto. In the interest of clarity, common reference characters will be used to designate components from FIG. 1 having a like function in FIG. 4 and the subsequent FIGURES.

Referring to FIG. 4, flow battery 100 includes autonomous solids separator 102 (i.e., a lamella clarifier or hydrocyclone) located downstream of pump 60 and upstream of the negative half-cell in flow loop 62. Although FIG. 4 has depicted autonomous solids separator 102 within flow loop 62, it is to be recognized that autonomous solids separator 102 can also be present within flow loop 62', thereby protecting the positive half-cell against incursion of solids. As discussed hereinbelow, both half-cells can also be protected simultaneously in a similar manner.

Figure 5:
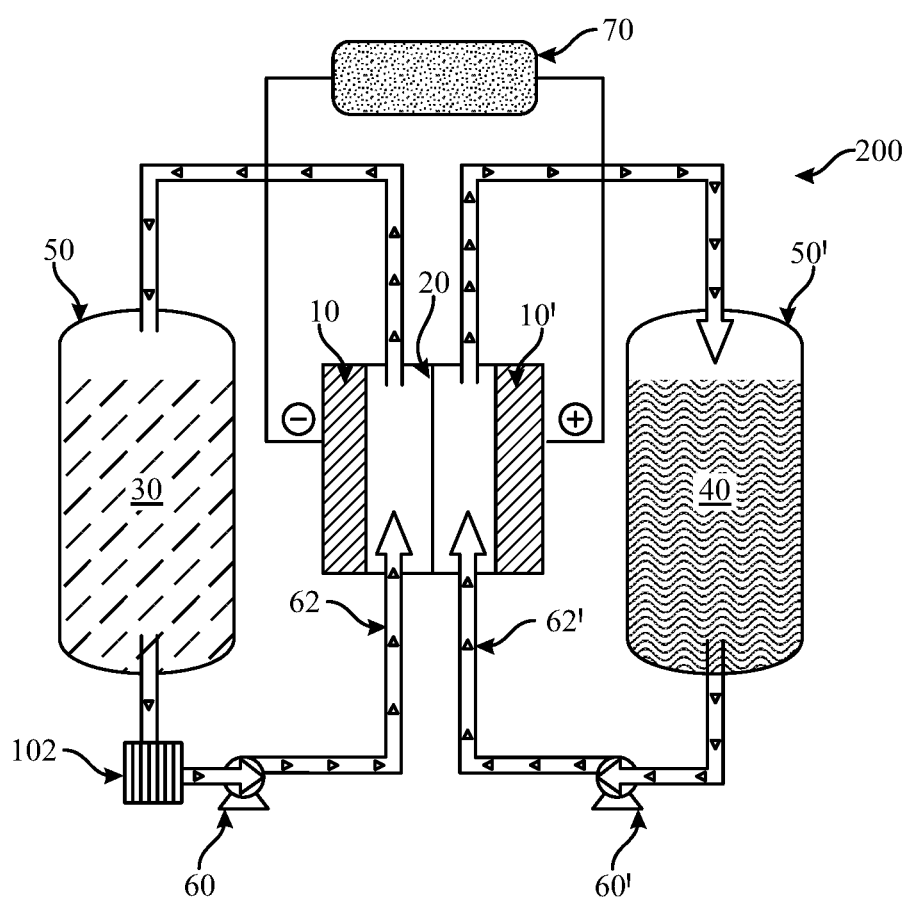
FIG. 5 shows a schematic of an illustrative flow battery containing an autonomous solids separator located in a flow loop between an electrolyte reservoir and a pump.

Other locations for an autonomous solids separator are possible, and configuration of a flow battery to meet the requirements of a particular application can be performed. In some embodiments, an autonomous solids separator (e.g., a lamella clarifier or hydrocyclone) can be disposed upstream of the pump in the flow loop, particularly between the electrolyte reservoir and the pump. Such a configuration is depicted in FIG. 5, which shows a schematic of illustrative flow battery 200 containing autonomous solids separator 102 located in flow loop 62 between electrolyte reservoir 50 and pump 60. Disposing a lamella clarifier or hydrocyclone in this location can provide immediate downstream protection of pump 60 against damage from solids. Although some pumps are amenable to the transportation of solids (e.g., diaphragm pumps and other positive displacement pumps), others are not. Accordingly, protection of a pump against solids can be desirable in some instances. The other half-cell of flow battery 200 can be protected in a similar manner. Further details concerning FIG. 5 can be discerned through further reference to FIGS. 1 and 4 and their accompanying description.

Still other alternative locations for an autonomous solids separator are also possible. For example, in some embodiments, at least one lamella clarifier can be disposed in the first half-cell or the second half-cell of the flow battery. In illustrative embodiments, a bipolar plate in a flow battery half-cell can contain inclined channels or planes, thereby functioning as a lamella clarifier consistent with the disclosure herein when an electrolyte solution is circulated upwardly therethrough.

In still other alternative embodiments, at least one lamella clarifier or hydrocyclone can be disposed in an electrolyte reservoir. Accordingly, in some embodiments, illustrative lamella clarifier 120 depicted in FIG. 2 or a similar lamella clarifier can constitute electrolyte reservoir 50 and/or 50' in the FIGURES. In this regard, it should be further noted that the locations for inflow and outflow of flow loops 62 and 62' through the various flow battery components in the FIGURES are exemplary and should be considered non-limiting. Thus, in the case wherein a lamella clarifier constitutes one or both of electrolyte reservoirs 50 or 50' or is housed within one or both of electrolyte reservoirs 50 or 50', electrolyte solution 30 or 40 can exit at a location other than the bottom of electrolyte reservoirs 50 and 50', as presently depicted in the FIGURES. For example, flow loops 62 and/or 62' can be configured to circulate electrolyte solution 30 and/or 40 upwardly within electrolyte reservoirs 50 and/or 50' to promote settling of solids, as described above in reference to FIG. 2.

Although the FIGURES have depicted a single autonomous solids separator, such as a lamella clarifier or a hydrocyclone, in fluid communication with a single half-cell of a flow battery, it is to be recognized that multiple autonomous solids separators can also be present in some embodiments. Accordingly, in some embodiments, an autonomous solids separator can be in fluid communication with each half-cell of a flow battery. When multiple autonomous solids separators are present, the autonomous solids separator in each flow loop can be the same or different. Thus, in some embodiments, a lamella clarifier can be in fluid communication with each half-cell of the flow battery, and in other embodiments, a hydrocyclone can be in fluid communication with each half-cell of the flow battery. In still other embodiments, a lamella clarifier can be in fluid communication with one half-cell of the flow battery, and a hydrocyclone can be in fluid communication with the other half-cell of the flow battery. Different autonomous solids separators in each flow loop can be utilized when solids of differing types and properties are present in each flow loop, for example. Exemplary locations for a lamella clarifier, hydrocyclone or other autonomous solids separator in each flow loop can include, but are not limited to, any combination of the illustrative configurations described herein.

Accordingly, in still more specific embodiments of the present disclosure, at least one lamella clarifier or at least one hydrocyclone can be in fluid communication with a negative half-cell of the flow battery. In alternative embodiments, at least one lamella clarifier or at least one hydrocyclone can be in fluid communication with a positive half-cell of the flow battery.

Similarly, multiple autonomous solids separators can be in fluid communication with one or both half-cells of a flow battery. That is, in some embodiments, multiple lamella clarifiers, hydrocyclones, or any combination thereof can be present within a single flow loop in a given flow battery. The number, type and location can be modified to meet the requirements of a particular application. For example, multiple autonomous solids separators can be employed in a single flow loop if a single autonomous solids separator is ineffective to remove a sufficient amount of solids and/or if solids of different sizes or densities can be separated more effectively using different separation mechanisms.

Still other options are available for circulating an electrolyte solution in a flow battery containing an autonomous solids separator. In some embodiments, the flow batteries can further include a secondary flow line configured to bypass a lamella clarifier or hydrocyclone in the first flow loop or the second flow loop. Utilization of the secondary flow line can take place, for example, when solids are not present in the electrolyte solution, when solids are being removed from the autonomous solids separator, and/or if maintenance needs to be performed on the autonomous solids separator.

Figure 6:
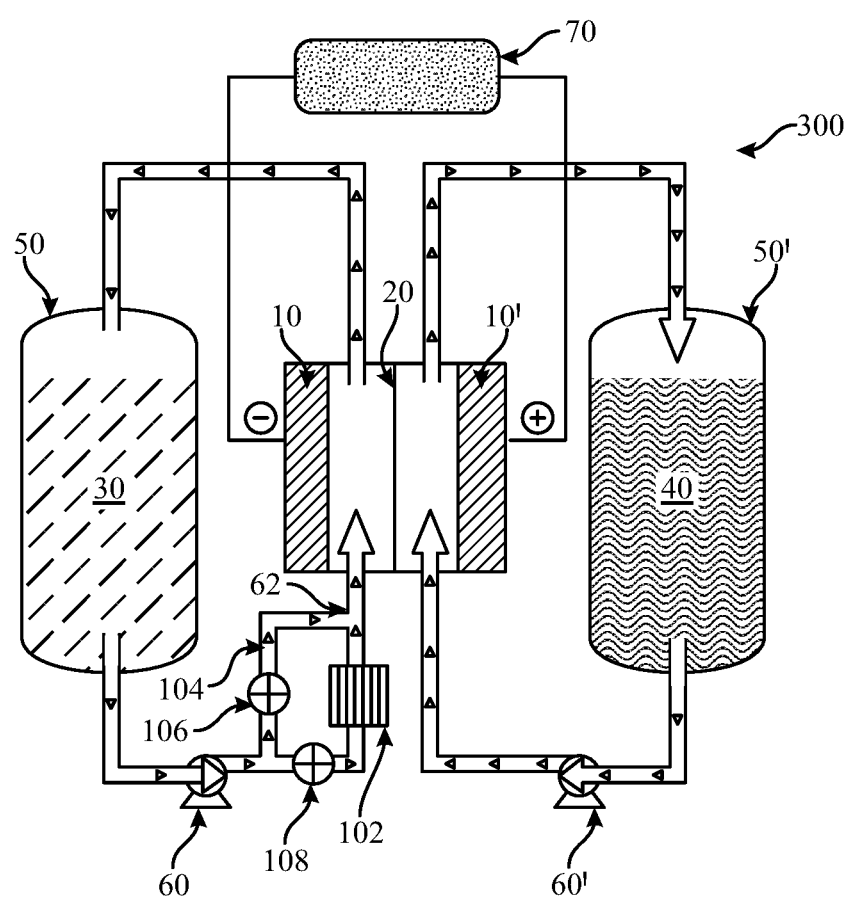
FIG. 6 shows a schematic of an illustrative flow battery having a secondary flow line disposed therein.

FIG. 6 shows a schematic of an illustrative flow battery having a secondary flow line disposed therein. FIG. 6 bears similarity to flow batteries of the preceding FIGURES and may be better understood by reference thereto. As shown in FIG. 6, flow battery 300 contains secondary flow line 104, which bypasses autonomous solids separator 102 within flow loop 62. Valves 106 and 108 allow secondary flow line 104 to be opened or closed as needed, while also shutting off circulation through autonomous solids separator 102. It is again to be emphasized that the positioning of autonomous solids separator 102 in FIG. 6 is illustrative, and any of the other flow battery configurations discussed herein can similarly incorporate a secondary flow line in a similar manner.

Processing of the solids removed by the autonomous solids separator within the flow battery will now be addressed in further detail. The nature of the solids (e.g., size, amount, solubility, and the like) can dictate how they are further processed. In illustrative embodiments, a solids-containing outflow from the autonomous solids separator can be directed to an electrolyte reservoir (either promoting redissolution over an extended timeframe and/or deferring the issue of solids removal until a later time), returned to an inflow location of the autonomous solids separator, or transferred to a filtration system, heat source or settling tank that is external of the flow loops. Exposure of a solids-containing outflow to an external heat source, for example, can promote redissolution of solids at elevated solvent temperatures.

In more specific embodiments, at least one lamella clarifier can be configured to discharge a solids-containing outflow to at least one location selected from an electrolyte reservoir, an inflow location of the at least one lamella clarifier, a filtration system external to the flow loops, a heat source external to the flow loops, a settling tank external to the flow loops, or any combination thereof. Similarly, in other more specific embodiments, at least one hydrocyclone can be configured to discharge a solids-containing outflow to at least one location selected from an electrolyte reservoir, an inflow location of the at least one hydrocyclone, a filtration system external to the flow loops, a heat source external to the flow loops, a settling tank external to the flow loops, or any combination thereof.

Figure 7:
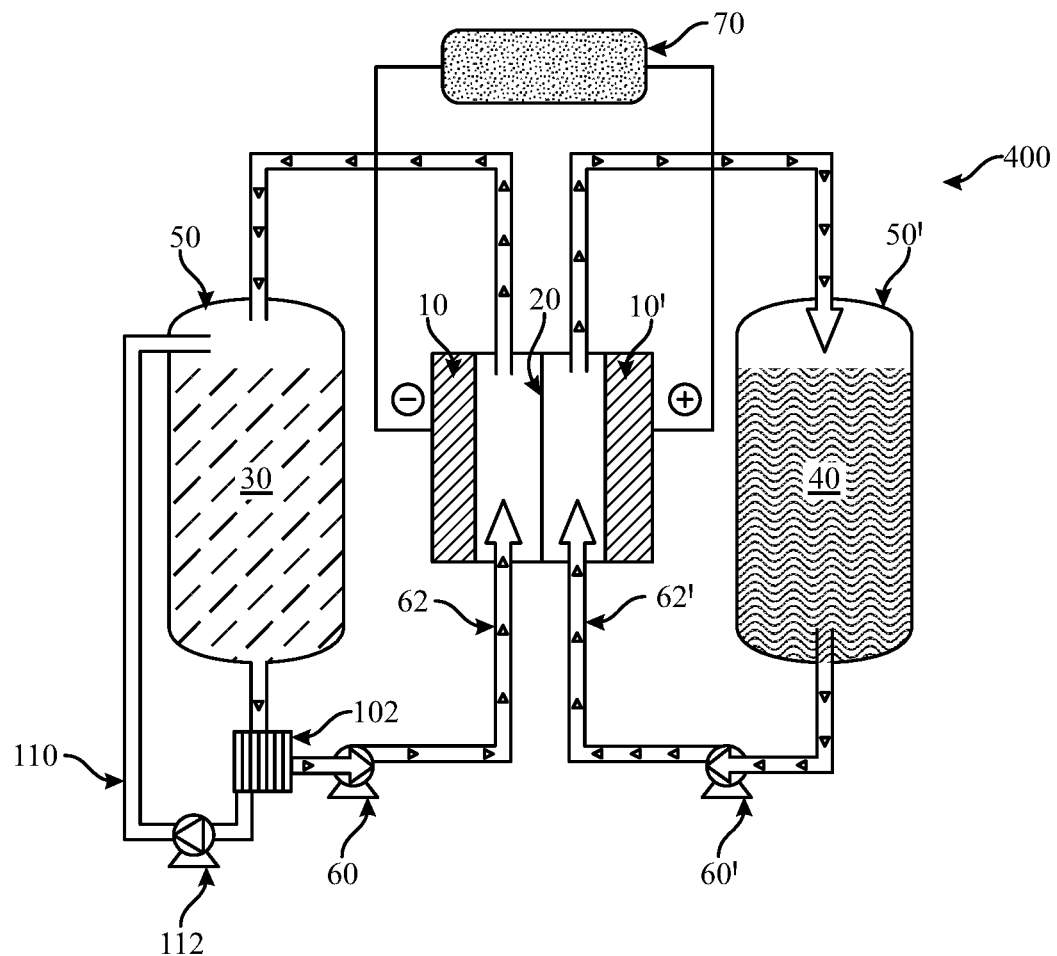
FIGS. 7-9 show schematics of illustrative flow battery configurations in which a solids-containing outflow from an autonomous solids separator can be processed in various ways.
Figure 8:
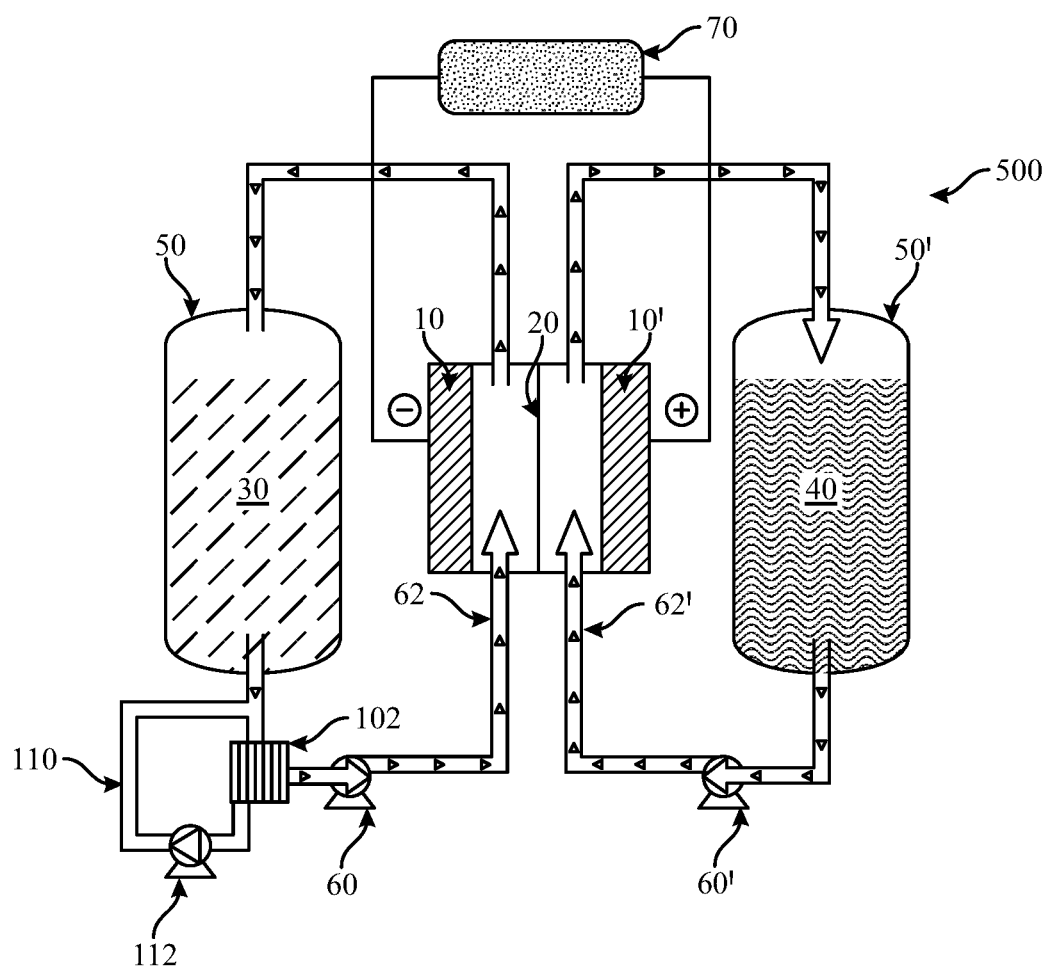
Figure 9:
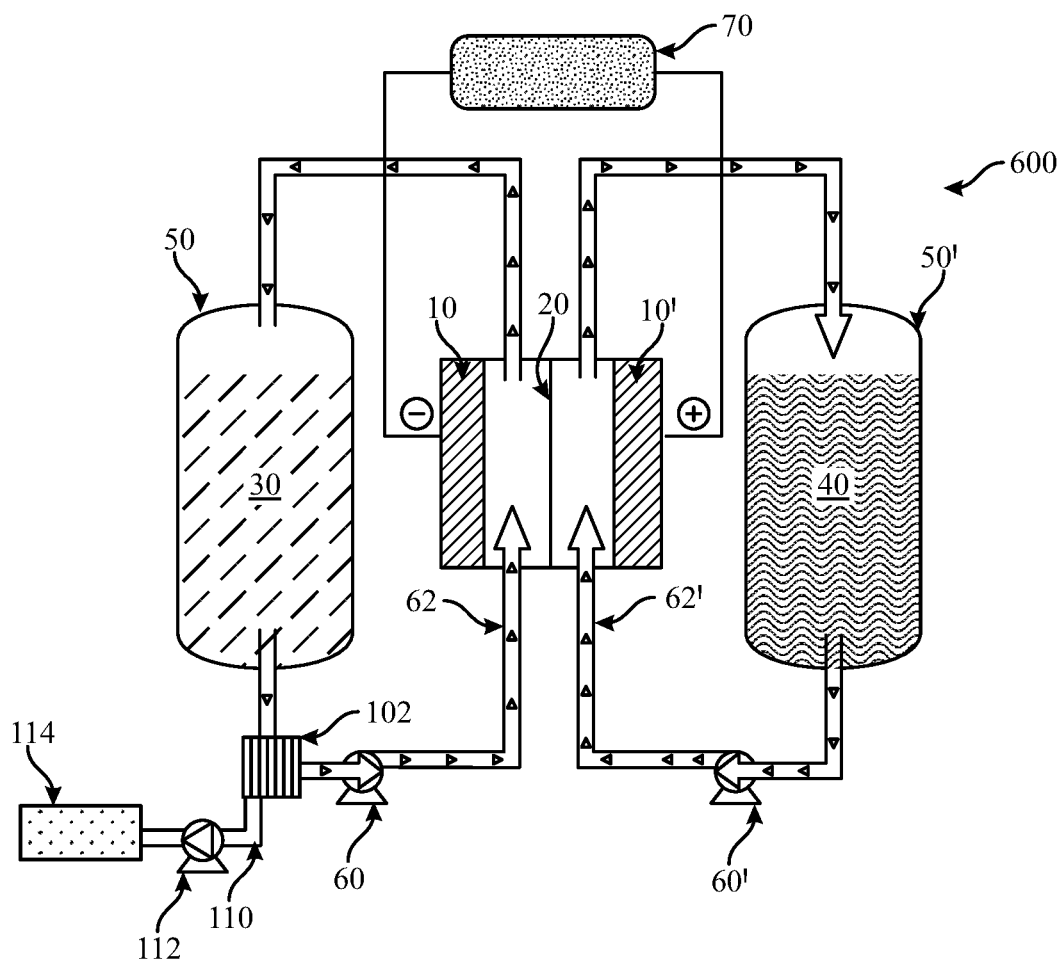

FIGS. 7-9 show schematics of illustrative flow battery configurations in which a solids-containing outflow from an autonomous solids separator can be processed in various ways. As shown in FIG. 7, line 110 and pump 112 are configured to return a solids-containing outflow to electrolyte reservoir 50 in flow battery 400. Similarly, in FIG. 8, line 110 and pump 112 are configured to return a solids-containing outflow to autonomous solids separator 102 via its inflow location in flow battery 500. That is, line 110 can be configured to recycle the solids-containing outflow to autonomous solids separator 102. Depending on whether autonomous solids separator 102 is a lamella clarifier or hydrocyclone, the inflow location can differ somewhat over that depicted. In this regard, it is again to be emphasized that the depicted flow battery configurations are for purposes of illustration only and should be considered non-limiting.

In FIG. 9, the solids-containing outflow from autonomous solids separator 102 is processed externally from flow loop 62 in flow battery 600. Specifically, as depicted in FIG. 9, line 110 and pump 112 divert the solids-containing outflow to external processing unit 114. In various embodiments, external processing unit 114 can be a heat source, a filtration system, or a settling tank, for example. Once the solids have been separated in external processing unit 114, any remaining electrolyte solution can be returned to an appropriate location in flow loop 62 via a return line (not shown).

As shown in the FIGURES, flow batteries of the present disclosure include electrodes in each half-cell. The electrodes provide for the conveyance of electrical current from an external circuit to a location in an electrochemical cell where electrochemical energy conversion takes place. The electrodes can provide a surface upon which electrochemical reactions take place. Suitable conductive materials for inclusion in an electrode within a flow battery can include, for example, carbon and/or metals such as gold, silver, titanium or platinum. Other suitable conductive materials can include, for example, steel, zinc, tantalum, palladium, tin, nickel, copper, iridium, rhodium, ruthenium, boron nitride, tungsten carbide, boron-doped diamond, and degenerately doped semiconductors. Oxides of metallic conductive materials can also be suitable in some embodiments. In some embodiments, suitable electrodes can be in the form of a porous sheet containing one or more of the foregoing materials.

In some embodiments, flow batteries of the present disclosure can include one or more electrolyte solutions containing an active material that is a coordination complex. As used herein, the terms "coordination complex" and "coordination compound" refer to any compound having a metal bound to one or more ligands through a covalent bond. Due to their variable oxidation states, transition metals can be highly desirable for use within the active materials of a flow battery. Cycling between the accessible oxidation states can result in the conversion of chemical energy into electrical energy. Lanthanide metals can be used similarly in this regard in alternative embodiments. Particularly desirable transition metals for inclusion in a flow battery include, for example, Al, Cr, Ti and Fe. For purposes of the present disclosure, Al is to be considered a transition metal. In some embodiments, coordination complexes within a flow battery can include at least one catecholate or substituted catecholate ligand. Sulfonated catecholate ligands can be particularly desirable ligands due to their ability to promote solubility of coordination complexes in which they are present.

Other ligands that can be present in coordination complexes, alone or in combination with one or more catecholate or substituted catecholate ligands, include, for example, ascorbate, citrate, glycolate, a polyol, gluconate, hydroxyalkanoate, acetate, formate, benzoate, malate, maleate, phthalate, sarcosinate, salicylate, oxalate, urea, polyamine, aminophenolate, acetylacetonate, and lactate. Where chemically feasible, it is to be recognized that such ligands can be optionally substituted with at least one group selected from among $C_{1-6}$ alkoxy, $C_{1-6}$ alkyl, $C_{1-6}$ alkenyl, $C_{1-6}$ alkynyl, 5- or 6-membered aryl or heteroaryl groups, a boronic acid or a derivative thereof, a carboxylic acid or a derivative thereof, cyano, halide, hydroxyl, nitro, sulfonate, a sulfonic acid or a derivative thereof, a phosphonate, a phosphonic acid or a derivative thereof, or a glycol, such as polyethylene glycol. Alkanoate includes any of the alpha, beta, and gamma forms of these ligands. Polyamines include, but are not limited to, ethylenediamine, ethylenediamine tetraacetic acid (EDTA), and diethylenetriamine pentaacetic acid (DTPA).

Other examples of ligands can be present include monodentate, bidentate, and/or tridentate ligands. Examples of monodentate ligands that can be present in a coordination complex include, for example, carbonyl or carbon monoxide, nitride, oxo, hydroxo, water, sulfide, thiols, pyridine, pyrazine, and the like. Examples of bidentate ligands that can be present in a coordination complex include, for example, bipyridine, bipyrazine, ethylenediamine, diols (including ethylene glycol), and the like. Examples of tridentate ligands that can be present a coordination complex include, for example, terpyridine, diethylenetriamine, triazacyclononane, tris(hydroxymethyl)aminomethane, and the like.

The active materials in a flow battery can be disposed in an aqueous electrolyte solution in which the active material is dissolved. As used herein, the term "aqueous electrolyte solution" refers to a homogeneous liquid phase with water as a predominant solvent in which an active material is at least partially solubilized, ideally fully solubilized. This definition encompasses both solutions in water and solutions containing a water-miscible organic solvent as a minority component of an aqueous phase.

Illustrative water-miscible organic solvents that can be present in an aqueous electrolyte solution include, for example, alcohols and glycols, optionally in the presence of one or more surfactants or other components discussed below. In more specific embodiments, an aqueous electrolyte solution can contain at least about 98% water by weight. In other more specific embodiments, an aqueous electrolyte solution can contain at least about 55% water by weight, or at least about 60% water by weight, or at least about 65% water by weight, or at least about 70% water by weight, or at least about 75% water by weight, or at least about 80% water by weight, or at least about 85% water by weight, or at least about 90% water by weight, or at least about 95% water by weight. In some embodiments, an aqueous electrolyte solution can be free of water-miscible organic solvents and consist of water alone as a solvent.

In further embodiments, an aqueous electrolyte solution can include a viscosity modifier, a wetting agent, or any combination thereof. Suitable viscosity modifiers can include, for example, corn starch, corn syrup, gelatin, glycerol, guar gum, pectin, and the like. Other suitable examples will be familiar to one having ordinary skill in the art. Suitable wetting agents can include, for example, various non-ionic surfactants and/or detergents. In some or other embodiments, an aqueous electrolyte solution can further include a glycol or a polyol. Suitable glycols can include, for example, ethylene glycol, diethylene glycol, and polyethylene glycol. Suitable polyols can include, for example, glycerol, mannitol, sorbitol, pentaerythritol, and tris(hydroxymethyl)aminomethane. Inclusion of any of these components in an aqueous electrolyte solution can help promote dissolution of a coordination complex or similar active material and/or reduce viscosity of the aqueous electrolyte solution for conveyance through a flow battery, for example.

In addition to a solvent and a coordination complex as an active material, an aqueous electrolyte solution can also include one or more mobile ions (i.e., an extraneous electrolyte). In some embodiments, suitable mobile ions can include proton, hydronium, or hydroxide. In other various embodiments, mobile ions other than proton, hydronium, or hydroxide can be present, either alone or in combination with proton, hydronium or hydroxide. Such alternative mobile ions can include, for example, alkali metal or alkaline earth metal cations (e.g., $Li^+$, $Na^+$, $K^+$, $Mg^{2+}$, $Ca^{2+}$ and $Sr^{2+}$) and halides (e.g., $F^-$, $Cl^-$, or $Br^-$). Other suitable mobile ions can include, for example, ammonium and tetraalkylammonium ions, chalcogenides, phosphate, hydrogen phosphate, phosphonate, nitrate, sulfate, nitrite, sulfite, perchlorate, tetrafluoroborate, hexafluorophosphate, and any combination thereof. In some embodiments, less than about 50% of the mobile ions can constitute protons, hydronium, or hydroxide. In other various embodiments, less than about 40%, less than about 30%, less than about 20%, less than about 10%, less than about 5%, or less than about 2% of the mobile ions can constitute protons, hydronium, or hydroxide.

Flow batteries of the present disclosure can provide sustained charge or discharge cycles of several hour durations. As such, they can be used to smooth energy supply/demand profiles and provide a mechanism for stabilizing intermittent power generation assets (e.g., from renewable energy sources such as solar and wind energy). It should be appreciated, then, that various embodiments of the present disclosure include energy storage applications where such long charge or discharge durations are desirable. For example, in non-limiting examples, the flow batteries of the present disclosure can be connected to an electrical grid to allow renewables integration, peak load shifting, grid firming, baseload power generation and consumption, energy arbitrage, transmission and distribution asset deferral, weak grid support, frequency regulation, or any combination thereof. When not connected to an electrical grid, the flow batteries of the present disclosure can be used as power sources for remote camps, forward operating bases, off-grid telecommunications, remote sensors, the like, and any combination thereof. Further, while the disclosure herein is generally directed to flow batteries, it is to be appreciated that other electrochemical energy storage media can incorporate the electrolyte solutions and coordination complexes described herein, specifically those utilizing stationary electrolyte solutions.

In some embodiments, flow batteries can include: a first chamber containing a negative electrode contacting a first aqueous electrolyte solution; a second chamber containing a positive electrode contacting a second aqueous electrolyte solution, and a separator disposed between the first and second electrolyte solutions. The chambers provide separate reservoirs within the cell, through which the first and/or second electrolyte solutions circulate so as to contact the respective electrodes and the separator. Each chamber and its associated electrode and electrolyte solution define a corresponding half-cell. The separator provides several functions which include, for example, (1) serving as a barrier to mixing of the first and second electrolyte solutions, (2) electrically insulating to reduce or prevent short circuits between the positive and negative electrodes, and (3) to facilitate ion transport between the positive and negative electrolyte chambers, thereby balancing electron transport during charge and discharge cycles. The negative and positive electrodes provide a surface where electrochemical reactions can take place during charge and discharge cycles. During a charge or discharge cycle, electrolyte solutions can be transported from separate storage tanks through the corresponding chambers, as shown in the various FIGURES herein. In a charging cycle, electrical power can be applied to the cell such that the active material contained in the second electrolyte solution undergoes a one or more electron oxidation and the active material in the first electrolyte solution undergoes a one or more electron reduction. Similarly, in a discharge cycle the second active material is reduced and the first active material is oxidized to generate electrical power.

The separator can be a porous membrane in some embodiments and/or an ionomer membrane in other various embodiments. In some embodiments, the separator can be formed from an ionically conductive polymer. Regardless of its type, the separator or membrane can be ionically conductive toward various ions.

Polymer membranes can be anion- or cation-conducting electrolytes. Where described as an "ionomer," the term refers to polymer membrane containing both electrically neutral repeating units and ionized repeating units, where the ionized repeating units are pendant and covalently bonded to the polymer backbone. In general, the fraction of ionized units can range from about 1 mole percent to about 90 mole percent. For example, in some embodiments, the content of ionized units is less than about 15 mole percent; and in other embodiments, the ionic content is higher, such as greater than about 80 mole percent. In still other embodiments, the ionic content is defined by an intermediate range, for example, in a range of about 15 to about 80 mole percent. Ionized repeating units in an ionomer can include anionic functional groups such as sulfonate, carboxylate, and the like. These functional groups can be charge balanced by, mono-, di-, or higher-valent cations, such as alkali or alkaline earth metals. Ionomers can also include polymer compositions containing attached or embedded quaternary ammonium, sulfonium, phosphazenium, and guanidinium residues or salts. Suitable examples will be familiar to one having ordinary skill in the art.

In some embodiments, polymers useful as a separator can include highly fluorinated or perfluorinated polymer backbones. Certain polymers useful in the present disclosure can include copolymers of tetrafluoroethylene and one or more fluorinated, acid-functional co-momomers, which are commercially available as NAFION™ perfluorinated polymer electrolytes from DuPont. Other useful perfluorinated polymers can include copolymers of tetrafluoroethylene and $FSO_2$—$CF_2CF_2CF_2CF_2$—O—CF=$CF_2$, FLEMION™ and SELEMION™.

Additionally, substantially non-fluorinated membranes that are modified with sulfonic acid groups (or cation exchanged sulfonate groups) can also be used. Such membranes can include those with substantially aromatic backbones such as, for example, polystyrene, polyphenylene, biphenyl sulfone (BPSH), or thermoplastics such as polyetherketones and polyethersulfones.

Battery-separator style porous membranes, can also be used as the separator. Because they contain no inherent ionic conduction capabilities, such membranes are typically impregnated with additives in order to function. These membranes typically contain a mixture of a polymer and inorganic filler, and open porosity. Suitable polymers can include, for example, high density polyethylene, polypropylene, polyvinylidene difluoride (PVDF), or polytetrafluoroethylene (PTFE). Suitable inorganic fillers can include silicon carbide matrix material, titanium dioxide, silicon dioxide, zinc phosphide, and ceria.

Separators can also be formed from polyesters, polyetherketones, poly(vinyl chloride), vinyl polymers, and substituted vinyl polymers. These can be used alone or in combination with any previously described polymer.

Porous separators are non-conductive membranes which allow charge transfer between two electrodes via open channels filled with electrolyte. The permeability increases the probability of active materials passing through the separator from one electrode to another and causing cross-contamination and/or reduction in cell energy efficiency. The degree of this cross contamination can depend on, among other features, the size (the effective diameter and channel length), and character (hydrophobicity/hydrophilicity) of the pores, the nature of the electrolyte, and the degree of wetting between the pores and the electrolyte.

The pore size distribution of a porous separator is generally sufficient to substantially prevent the crossover of active materials between the two electrolyte solutions. Suitable porous membranes can have an average pore size distribution of between about 0.001 nm and 20 micrometers, more typically between about 0.001 nm and 100 nm. The size distribution of the pores in the porous membrane can be substantial. In other words, a porous membrane can contain a first plurality of pores with a very small diameter (approximately less than 1 nm) and a second plurality of pores with a very large diameter (approximately greater than 10 micrometers). The larger pore sizes can lead to a higher amount of active material crossover. The ability for a porous membrane to substantially prevent the crossover of active materials can depend on the relative difference in size between the average pore size and the active material. For example, when the active material is a metal center in a coordination complex, the average diameter of the coordination complex can be about 50% greater than the average pore size of the porous membrane. On the other hand, if a porous membrane has substantially uniform pore sizes, the average diameter of the coordination complex can be about 20% larger than the average pore size of the porous membrane. Likewise, the average diameter of a coordination complex is increased when it is further coordinated with at least one water molecule. The diameter of a coordination complex of at least one water molecule is generally considered to be the hydrodynamic diameter. In such embodiments, the hydrodynamic diameter is generally at least about 35% greater than the average pore size. When the average pore size is substantially uniform, the hydrodynamic radius can be about 10% greater than the average pore size.

In some embodiments, the separator can also include reinforcement materials for greater stability. Suitable reinforcement materials can include nylon, cotton, polyesters, crystalline silica, crystalline titania, amorphous silica, amorphous titania, rubber, asbestos, wood or any combination thereof.

Separators within the flow batteries of the present disclosure can have a membrane thickness of less than about 500 micrometers, or less than about 300 micrometers, or less than about 250 micrometers, or less than about 200 micrometers, or less than about 100 micrometers, or less than about 75 micrometers, or less than about 50 micrometers, or less than about 30 micrometers, or less than about 25 micrometers, or less than about 20 micrometers, or less than about 15 micrometers, or less than about 10 micrometers. Suitable separators can include those in which the flow battery is capable of operating with a current efficiency of greater than about 85% with a current density of 100 mA/cm$^2$ when the separator has a thickness of 100 micrometers. In further embodiments, the flow battery is capable of operating at a current efficiency of greater than 99.5% when the separator has a thickness of less than about 50 micrometers, a current efficiency of greater than 99% when the separator has a thickness of less than about 25 micrometers, and a current efficiency of greater than 98% when the separator has a thickness of less than about 10 micrometers. Accordingly, suitable separators include those in which the flow battery is capable of operating at a voltage efficiency of greater than 60% with a current density of 100 mA/cm$^2$. In further embodiments, suitable separators can include those in which the flow battery is capable of operating at a voltage efficiency of greater than 70%, greater than 80% or even greater than 90%.

The diffusion rate of the first and second active materials through the separator can be less than about $1\times1.0^{-5}$ mol cm$^{-2}$ day$^{-1}$, or less than about $1\times10^{-6}$ mol cm$^{-2}$ day$^{-1}$, or less than about $1\times10^{-7}$ mol cm$^{-2}$ day$^{-1}$, or less than about $1\times10^{-9}$ mol cm$^{-2}$ day$^{-1}$, or less than about $1\times10^{-11}$ mol cm$^{-2}$ day$^{-1}$, or less than about $1\times10^{-13}$ mol cm$^{-2}$ day$^{-1}$, or less than about $1\times10^{-15}$ mol cm$^{-2}$ day$^{-1}$.

The flow batteries can also include an external electrical circuit in electrical communication with the first and second electrodes. The circuit can charge and discharge the flow battery during operation. Reference to the sign of the net ionic charge of the first, second, or both active materials relates to the sign of the net ionic charge in both oxidized and reduced forms of the redox active materials under the conditions of the operating flow battery. Further exemplary embodiments of a flow battery provide that (a) the first active material has an associated net positive or negative charge and is capable of providing an oxidized or reduced form over an electric potential in a range of the negative operating potential of the system, such that the resulting oxidized or reduced form of the first active material has the same charge sign (positive or negative) as the first active material and the ionomer membrane also has a net ionic charge of the same sign; and (b) the second active material has an associated net positive or negative charge and is capable of providing an oxidized or reduced form over an electric potential in a range of the positive operating potential of the system, such that the resulting oxidized or reduced form of the second active material has the same charge sign (positive or negative sign) as the second active material and the ionomer membrane also has a net ionic charge of the same sign; or both (a) and (b). The matching charges of the first and/or second active materials and the ionomer membrane can provide a high selectivity. More specifically, charge matching can provide less than about 3%; less than about 2%, less than about 1%, less than about 0.5%, less than about 0.2%, or less than about 0.1% of the molar flux of ions passing through the ionomer membrane as being attributable to the first or second active material. The term "molar flux of ions" will refer to the amount of ions passing through the ionomer membrane, balancing the charge associated with the flow of external electricity/electrons. That is, the flow battery is capable of operating or operates with the substantial exclusion of the active materials by the ionomer membrane, and such exclusion can be promoted through charge matching.

Flow batteries of the present disclosure can have one or more of the following operating characteristics: (a) where, during the operation of the flow battery, the first or second active materials comprise less than about 3% of the molar flux of ions passing through the ionomer membrane; (b) where the round trip current efficiency is greater than about 70%, greater than about 80%, or greater than about 90%; (c) where the round trip current efficiency is greater than about 90%; (d) where the sign of the net ionic charge of the first, second, or both active materials is the same in both oxidized and reduced forms of the active materials and matches that of the ionomer membrane; (e) where the ionomer membrane has a thickness of less than about 100 μm, less than about 75 μm, less than about 50 μm, or less than about 250 μm; (f) where the flow battery is capable of operating at a current density of greater than about 100 mA/cm$^2$ with a round trip voltage efficiency of greater than about 60%; and (g) where the energy density of the electrolyte solutions is greater than about 10 Wh/L, greater than about 20 Wh/L, or greater than about 30 Wh/L.

In some cases, a user may desire to provide higher charge or discharge voltages than available from a single electrochemical cell. In such cases, several battery cells can be connected in series such that the voltage of each cell is additive. This forms a bipolar stack, also referred to as an electrochemical stack. As discussed herein, a bipolar plate can be employed to connect adjacent electrochemical cells in a bipolar stack, which allows for electron transport to take place but prevents fluid or gas transport between adjacent cells. The positive electrode compartments and negative electrode compartments of individual cells can be fluidically connected via common positive and negative fluid manifolds in the bipolar stack. In this way, individual cells can be stacked in series to yield a voltage appropriate for DC applications or conversion to AC applications.

In additional embodiments, the cells, bipolar stacks, or batteries can be incorporated into larger energy storage systems, suitably including piping and controls useful for operation of these large units. Piping, control, and other equipment suitable for such systems are known in the art, and can include, for example, piping and pumps in fluid communication with the respective chambers for moving electrolyte solutions into and out of the respective chambers and storage tanks for holding charged and discharged electrolytes. The cells, cell stacks, and batteries of this disclosure can also include an operation management system. The operation management system can be any suitable controller device, such as a computer or microprocessor, and can contain logic circuitry that sets operation of any of the various valves, pumps, circulation loops, and the like.

In more specific embodiments, a flow battery system can include a flow battery (including a cell or cell stack); storage tanks and piping for containing and transporting the electrolyte solutions; control hardware and software (which may include safety systems), and a power conditioning unit. The flow battery cell stack accomplishes the conversion of charging and discharging cycles and determines the peak power. The storage tanks contain the positive and negative active materials, such as the coordination complexes disclosed herein, and the tank volume determines the quantity of energy stored in the system. The control software, hardware, and optional safety systems suitably include sensors, mitigation equipment and other electronic/hardware controls and safeguards to ensure safe, autonomous, and efficient operation of the flow battery system. A power conditioning unit can be used at the front end of the energy storage system to convert incoming and outgoing power to a voltage and current that is optimal for the energy storage system or the application. For the example of an energy storage system connected to an electrical grid, in a charging cycle the power conditioning unit can convert incoming AC electricity into DC electricity at an appropriate voltage and current for the cell stack. In a discharging cycle, the stack produces DC electrical power and the power conditioning unit converts it to AC electrical power at the appropriate voltage and frequency for grid applications.

Where not otherwise defined hereinabove or understood by one having ordinary skill in the art, the definitions in the following paragraphs will be applicable to the present disclosure.

As used herein, the term "energy density" refers to the amount of energy that can be stored, per unit volume, in the active materials. Energy density refers to the theoretical energy density of energy storage and can be calculated by Equation 1:

$$\text{Energy density} = (26.8 \text{ A-h/mol}) \times OCV \times [e^-] \quad (1)$$

where OCV is the open circuit potential at 50% state of charge, (26.8 A–h/mol) is Faraday's constant, and [e⁻] is the concentration of electrons stored in the active material at 99% state of charge. In the case that the active materials largely are an atomic or molecular species for both the positive and negative electrolyte, [e⁻] can be calculated by Equation 2 as:

$$[e^-] = [\text{active materials}] \times N/2 \quad (2)$$

where [active materials] is the molar concentration of the active material in either the negative or positive electrolyte, whichever is lower, and N is the number of electrons transferred per molecule of active material. The related term "charge density" refers to the total amount of charge that each electrolyte contains. For a given electrolyte, the charge density can be calculated by Equation 3

$$\text{Charge density} = (26.8 \text{ A-h/mol}) \times [\text{active material}] \times N \quad (3)$$

where [active material] and N are as defined above.

As used herein, the term "current density" refers to the total current passed in an electrochemical cell divided by the geometric area of the electrodes of the cell and is commonly reported in units of mA/cm².

As used herein, the term "current efficiency" ($I_{eff}$) can be described as the ratio of the total charge produced upon discharge of a cell to the total charge passed during charging. The current efficiency can be a function of the state of charge of the flow battery. In some non-limiting embodiments, the current efficiency can be evaluated over a state of charge range of about 35% to about 60%.

As used herein, the term "voltage efficiency" can be described as the ratio of the observed electrode potential, at a given current density, to the half-cell potential for that electrode (×100%). Voltage efficiencies can be described for a battery charging step, a discharging step, or a "round trip voltage efficiency." The round trip voltage efficiency ($V_{eff,RT}$) at a given current density can be calculated from the cell voltage at discharge ($V_{discharge}$) and the voltage at charge ($V_{charge}$) using equation 4:

$$V_{eff,RT} \times V_{discharge}/V_{charge} \times 100\% \quad (4)$$

As used herein, the terms "negative electrode" and "positive electrode" are electrodes defined with respect to one another, such that the negative electrode operates or is designed or intended to operate at a potential more negative than the positive electrode (and vice versa), independent of the actual potentials at which they operate, in both charging and discharging cycles. The negative electrode may or may not actually operate or be designed or intended to operate at a negative potential relative to a reversible hydrogen electrode. The negative electrode is associated with a first electrolyte solution and the positive electrode is associated with a second electrolyte solution, as described herein. The electrolyte solutions associated with the negative and positive electrodes may be described as negolytes and posolytes, respectively.

Accordingly, the present disclosure also provides methods for mitigating solids within a flow battery. As discussed above, solids can form at various locations or points in time during the lifetime of a flow battery, and the particular location or point in time at which the solids arise and undergo mitigation is not considered to be particularly limited in the embodiments of the present disclosure.

In some embodiments, methods of the present disclosure can include placing at least one autonomous solids separator in fluid communication with at least one half-cell of a flow battery containing an electrolyte solution, circulating the electrolyte solution through the at least one autonomous solids separator and the at least one half-cell, discharging a solids-containing outflow from the at least autonomous solids separator, and directing the solids-containing outflow away from the at least one half-cell. The at least one autonomous solids separator can be a lamella clarifier, a hydrocyclone or any combination thereof in various embodiments.

In more specific embodiments, methods of the present disclosure can include placing at least one lamella clarifier in fluid communication with at least one half-cell of a flow battery containing an electrolyte solution, circulating the electrolyte solution through the at least one lamella clarifier and the at least one half-cell, discharging a solids-containing outflow from the at least one lamella clarifier, and directing the solids-containing outflow away from the at least one half-cell. In other more specific embodiments, methods of the present disclosure can include placing at least one hydrocyclone in fluid communication with at least one half-cell of a flow battery containing an electrolyte solution, circulating the electrolyte solution through the at least hydrocyclone and the at least one half-cell, discharging a solids-containing outflow from the at least one hydrocyclone, and directing the solids-containing outflow away from the at least one half-cell. In more particular embodiments, as discussed above, the at least one lamella clarifier or the at least one hydrocyclone can define a portion of a flow loop within the flow battery.

Methods of the present disclosure can further include processing the solids-containing outflow from the autonomous solids separator. More particularly, methods of the present disclosure can include directing the solids-containing outflow to at least one location selected from an electrolyte reservoir, an inflow location of at least one lamella clarifier or at least one hydrocyclone, a filtration system external of the flow loops in the flow battery, a heat source external of the flow loops in the flow battery, a settling tank external of the flow loops in the flow battery or any combination thereof (see FIGS. 7-9, for example). During embodiments in which a solids-containing outflow is exposed to a heat source, methods of the present disclosure can further include redissolving at least a portion of the solids, and returning the electrolyte solution to the flow battery, as generally discussed above.

In still other further embodiments, methods of the present disclosure can include diverting at least a portion of the electrolyte solution to bypass the at least one lamella clarifier or the at least one hydrocyclone. As discussed above, diversion of the electrolyte solution can take place via a secondary flow line that is configured to bypass the at least one lamella clarifier or the at least one hydrocyclone.

Although the disclosure has been described with reference to the disclosed embodiments, those skilled in the art will readily appreciate that these are only illustrative of the disclosure. It should be understood that various modifications can be made without departing from the spirit of the disclosure. The disclosure can be modified to incorporate any number of variations, alterations, substitutions or equivalent arrangements not heretofore described, but which are commensurate with the spirit and scope of the disclosure. Additionally, while various embodiments of the disclosure have been described, it is to be understood that aspects of the disclosure may include only some of the described embodiments. Accordingly, the disclosure is not to be seen as limited by the foregoing description.

What is claimed is the following:

1. A flow battery comprising:
   a first half-cell containing a first electrolyte solution;
   a second half-cell containing a second electrolyte solution;
   a first reservoir containing the first electrolyte solution;
   a second reservoir containing the second electrolyte solution;
   a first flow loop comprising a first pump and configured to circulate the first electrolyte solution from the first reservoir through the first half-cell and returning to the first reservoir;
   a second flow loop comprising a second pump and configured to circulate the second electrolyte solution from the second reservoir through the second half-cell and returning to the second reservoir; and
   at least one lamella clarifier, each lamella clarifier comprising (a) an inflow location, (b) an outflow location, and (c) a solids outlet and separately positioned in the first flow loop, the second flow loop, or in each of the first and second flow loops;
   wherein the inflow location of each lamella clarifier is configured to receive an incoming electrolyte flow stream and is positioned upstream of the outflow location within the respective first and/or second flow,
   wherein each lamella clarifier is configured (i) to generate (a) an exiting electrolyte stream having a concentration of solids that is lower than that of the incoming electrolyte flow stream and (b) a solids-containing outflow stream having a concentration of solids that is higher than that of the incoming electrolyte flow stream and (ii) to direct the exiting electrolyte stream having the lower concentration of solids to exit the lamella clarifier through the outflow location and (iii) to direct the solids-containing outflow stream having the higher concentration of solids to exit the lamella clarifier through the solids outlet;
   and wherein the solids outlet is fluidically coupled to an external processing unit that is configured (i) to remove solids from the solids-containing outflow stream so as to provide a solids-depleted electrolyte stream and (ii) to direct the solids-depleted electrolyte stream to the respective first and/or second reservoir and/or the respective first and/or second flow loop via a return line.

2. The flow battery of claim 1, wherein each lamella clarifier is disposed between the respective first and/or second pump and an entry location of the first and/or second half-cell.

3. The flow battery of claim 1, wherein each lamella clarifier is disposed between the first and/or second electrolyte reservoir and the first and/or second pump, respectively.

4. The flow battery of claim 1, wherein the at least one lamella clarifier is disposed in the electrolyte reservoir.

5. The flow battery of claim 1, wherein the external processing unit is a filtration system, a heat source, a settling tank, or a combination thereof.

6. The flow battery of claim 1, further comprising a secondary line configured to bypass the at least one lamella clarifier in the respective first and/or second flow loop.

7. The flow battery of claim 1, wherein the external processing unit is configured to direct the solids-depleted electrolyte stream to the respective first and/or second reservoir.

8. A method comprising:
   circulating the first and second electrolyte solutions through the flow battery of claim 1
   discharging the solids-containing outflow stream from the at least one lamella clarifier to the external processing unit; and
   directing the solids-depleted electrolyte stream to the respective first and/or second reservoir and/or the first and/or second flow loop.

9. The method of claim 8, wherein the at least one lamella clarifier is disposed between the first and/or second pump and the first and/or second half-cell, respectively.

10. The method of claim 8, wherein the at least one lamella clarifier is disposed between the respective first and/or second electrolyte reservoir and the respective first and/or second pump.

11. The method of claim 8, wherein the at least one lamella clarifier is disposed in the respective first and/or second electrolyte reservoir.

12. The method of claim 8, wherein the external processing unit is a filtration system a heat source, a settling tank or any combination thereof.

13. The method of claim 8, further comprising diverting at least a portion of the electrolyte solution to bypass the at least one lamella clarifier.

14. The method of claim 8, wherein the solids-depleted electrolyte stream is directed to the respective first and/or second reservoir.

* * * * *